(12) United States Patent
Burleson, Jr.

(10) Patent No.: US 9,844,700 B1
(45) Date of Patent: Dec. 19, 2017

(54) AVALANCHE SELF-RESCUE DEVICE

(71) Applicant: Grady Burleson, Jr., Fort Walton Beach, FL (US)

(72) Inventor: Grady Burleson, Jr., Fort Walton Beach, FL (US)

(*) Notice: Subject to any disclaimer, the term of this patent is extended or adjusted under 35 U.S.C. 154(b) by 129 days.

(21) Appl. No.: 14/738,893

(22) Filed: Jun. 14, 2015

(51) Int. Cl.
*A63B 29/02* (2006.01)
*G01C 9/00* (2006.01)
*G01C 9/18* (2006.01)
*G01C 9/20* (2006.01)
*G08B 21/18* (2006.01)

(52) U.S. Cl.
CPC .............. *A63B 29/021* (2013.01); *G01C 9/00* (2013.01); *G01C 9/18* (2013.01); *G01C 9/20* (2013.01); *G08B 21/18* (2013.01); *G08B 21/182* (2013.01)

(58) Field of Classification Search
CPC .......... A63B 29/021; G01C 9/00; G01C 9/18; G01C 9/20; G08B 21/18; G08B 21/182
USPC ....... 116/209–211, DIG. 8, DIG. 9, DIG. 44; 340/521, 384.1, 392.1, 467, 669, 686.1, 340/689, 8.1, 10.1
See application file for complete search history.

(56) References Cited

U.S. PATENT DOCUMENTS

| | | | |
|---|---|---|---|
| 3,673,697 A | 7/1972 | Wasson | |
| 4,045,799 A * | 8/1977 | Dapiran | A63B 29/021 342/419 |
| 4,314,240 A * | 2/1982 | Schnug | A63B 29/021 340/571 |
| 4,331,957 A * | 5/1982 | Enander | A62B 33/00 342/193 |
| 4,850,031 A * | 7/1989 | Allsop | A63B 29/021 340/573.1 |
| 4,932,133 A | 6/1990 | Bruhn | |
| 5,075,671 A * | 12/1991 | Livingston, III | G08B 21/0297 116/142 FP |
| 5,187,871 A * | 2/1993 | McDermott | B63C 11/12 2/430 |
| 5,300,921 A * | 4/1994 | Hoch | A61B 5/1121 273/DIG. 17 |
| 5,570,323 A * | 10/1996 | Prichard | G01S 15/74 367/118 |
| 5,955,982 A * | 9/1999 | Moulin | A63B 29/021 342/146 |
| 6,260,508 B1 * | 7/2001 | Morse | G08B 5/002 116/211 |
| 6,270,386 B1 * | 8/2001 | Visocekas | A41D 13/018 441/104 |

(Continued)

*Primary Examiner* — R. A. Smith
*Assistant Examiner* — Tania Courson
(74) *Attorney, Agent, or Firm* — Peter Loffler

(57) ABSTRACT

An avalanche self-rescue device uses an MEMS accelerometer and possibly a gyroscope in order to determine its orientation relative to the gravitational horizon. Whenever the device is oriented vertically with respect to the gravitational horizon (pointing gravitationally upwardly), a speaker emits a tone to so indicate and possibly a light illuminates in conjunction with the sound output. A different tone and possibly a different light output may be dispensed whenever the accelerometer is not oriented vertically with respect to the gravitational horizon. The device can be a standalone device, incorporated in an item of clothing, safety equipment, etc., or integrated into another electronic device such as a rescue beacon or a cellular phone.

10 Claims, 6 Drawing Sheets

(56) References Cited

U.S. PATENT DOCUMENTS

| | | | | |
|---|---|---|---|---|
| 6,401,254 B1 * | 6/2002 | Boller | A41D 19/0027 | 116/223 |
| 6,411,207 B2 * | 6/2002 | Shaffer | G08B 7/06 | 340/521 |
| 6,412,482 B1 * | 7/2002 | Rowe | A62B 7/02 | 128/200.24 |
| 6,414,629 B1 * | 7/2002 | Curcio | B63C 9/0005 | 342/357.52 |
| 6,546,638 B2 | 4/2003 | Beyer | | |
| 6,941,226 B2 * | 9/2005 | Estep | G01S 5/0063 | 367/131 |
| 7,261,608 B2 * | 8/2007 | Haddacks | A62B 33/00 | 2/455 |
| 7,270,077 B2 * | 9/2007 | Beck | A62B 33/00 | 116/209 |
| 7,346,336 B2 * | 3/2008 | Kampel | A63B 29/021 | 340/539.11 |
| 7,399,099 B2 * | 7/2008 | Stokes | G08B 5/006 | 2/160 |
| 7,450,002 B2 * | 11/2008 | Choi | A61B 5/1117 | 340/539.11 |
| 7,557,727 B2 * | 7/2009 | Michida | A44B 19/262 | 116/100 |
| 7,603,961 B2 | 10/2009 | Mayenschein et al. | | |
| 7,908,041 B2 | 3/2011 | Cheok et al. | | |
| 8,061,293 B2 * | 11/2011 | Auerbach | A63B 29/021 | 116/209 |
| 8,091,422 B2 * | 1/2012 | Felske | B63C 11/02 | 116/202 |
| 8,179,277 B2 * | 5/2012 | Hollander | G09F 17/00 | 33/366.12 |
| 8,284,070 B2 * | 10/2012 | Chaudhari | G01C 9/00 | 340/573.1 |
| 8,325,032 B2 * | 12/2012 | Pan | G08B 21/22 | 340/539.11 |
| 8,369,893 B2 * | 2/2013 | Kirch | G06F 1/1626 | 340/5.82 |
| 8,485,681 B2 * | 7/2013 | Richter | F21V 33/0008 | 2/160 |
| 8,533,964 B1 | 9/2013 | Junk | | |
| 8,570,168 B2 * | 10/2013 | Logan | H04Q 9/00 | 340/539.32 |
| 8,677,639 B2 | 3/2014 | Neubauer et al. | | |
| 8,773,263 B2 * | 7/2014 | Thibault | G08B 13/08 | 116/86 |
| 9,140,557 B2 * | 9/2015 | Taylor, Jr. | G01C 21/16 | |
| 9,292,084 B2 * | 3/2016 | Abdollahi | A42B 3/042 | |
| 9,545,542 B2 * | 1/2017 | Binder | A63H 33/18 | |
| 9,596,551 B2 * | 3/2017 | Pedersen | H04R 1/1041 | |
| 2004/0094613 A1 | 5/2004 | Shiratori | A61B 5/1118 | 235/105 |
| 2004/0263338 A1 * | 12/2004 | Katz | G08B 7/06 | 340/573.4 |
| 2005/0151662 A1 * | 7/2005 | Kashuba | G01S 3/30 | 340/690 |
| 2005/0166410 A1 * | 8/2005 | Richter | G01C 9/06 | 33/366.12 |
| 2007/0277386 A1 * | 12/2007 | Bozzone | G01C 9/06 | 33/391 |
| 2008/0007427 A1 * | 1/2008 | Stokes | A41D 19/0157 | 340/901 |
| 2008/0125288 A1 * | 5/2008 | Case | G06F 17/40 | 482/1 |
| 2010/0020229 A1 * | 1/2010 | Hershey | H04N 5/2251 | 348/376 |
| 2010/0330940 A1 * | 12/2010 | Sheynblat | H01Q 1/242 | 455/129 |
| 2012/0086564 A1 * | 4/2012 | Sinha | H04M 1/23 | 340/407.1 |
| 2013/0081442 A1 * | 4/2013 | Basir | G01P 21/00 | 73/1.38 |
| 2013/0181810 A1 * | 7/2013 | Plotsker | G06F 1/163 | 340/5.52 |
| 2014/0156216 A1 * | 6/2014 | Ten Kate | A61B 5/1117 | 702/142 |
| 2016/0270728 A1 * | 9/2016 | McGinnis | A41D 13/0007 | |
| 2016/0309826 A1 * | 10/2016 | Anderson | A42B 3/044 | |
| 2016/0338621 A1 * | 11/2016 | Kanchan | A61B 5/0022 | |

* cited by examiner

AVALANCHE SELF-RESCUE DEVICE

BACKGROUND OF THE INVENTION

1. Field of the Invention

The present invention relates to a self-rescue device for use by a person buried as a result of an avalanche, the device providing the user with an audio and possibly a visual indication for a gravitationally vertical direction in order to direct the person in the proper direction for self-extraction from the burial.

2. Background of the Prior Art

An avalanche, sometimes referred to as a snow slip or a snow slide, is a rapid flow of snow down a sloped surface such as a side of a mountain. An avalanche can occur due to gravity due either to a weakening of the snow structure of the snowpack or due to increased load from precipitation. Alternately, an avalanche can be triggered by external forces such as skiers, snowmobilers, animals, explosives or seismic events. When an avalanche is triggered, the avalanche quickly accelerates and gains mass and volume as the avalanche entrains more snow along its downward path.

Skiers, snowmobilers, snowboarders, hikers, and others enjoying their respective activity in non-managed areas as well as casual hikers are ever aware of the dangers of an avalanche, as are people living or traveling through avalanche prone areas. As some avalanches, such as powder snow avalanches, can reach speeds approaching 200 miles per hours, such recreationalists are aware that if caught in the path of an avalanche, the ability to outrun or out maneuver the avalanche may not be possible. If a person is caught by an avalanche and survives the initial impact with the avalanche, the person may find himself or herself buried in snow, ten, twenty, thirty or even more feet thick, depending on the size of the avalanche encountered.

As a defensive measure for the possibility of being caught in an avalanche, many skiers, snowmobilers, and hikers, and others who may be in the path of a potential avalanche, carry avalanche transceivers commonly called rescue beacons or simply beacons. A rescue beacon is basically a transmitter carried by a person that put out a distress signal that is, hopefully, captured by a receiver being held by a rescue party so that the rescue party can locate the buried person and dig him or her out. Most rescue beacons can also act as receivers allowing a user to be a rescuer. Rescue beacons are often coupled with Recco transponders that are passive transponders that reflect back a directional signal emitted by a rescue party and are incorporated into the clothing or body protection of the user.

While such beacons, which come in a variety of architectures, can be effective, especially when used during companion rescue, such devices are not without their limits. Often, a person may be buried in a location that is sufficiently remote so that potential rescuers may not even be aware that an avalanche has occurred with the attendant the potential for a person or persons being buried in the snow. If the rescuers are so aware, the signal emanating from the beacon, which typically operates on the 457 kHz radio band, is effective for only a few hundred feet, may not be sufficiently strong so as to be captured by the rescuers so that the rescuers must first perform a blind search until a signal capture occurs. As the buried person has limited entrained oxygen available for breathing, time is of the extreme essence when attempting to locate the buried person. Sadly, often the rescue party locates the buried person too late to save the person. Many recreationalists, especially backcountry recreationalists, carry the more advanced Satellite Electronic Notification Device, which uses GPS technology to quickly guide a rescue party to the proximity of the buried person. However, due to costs of such devices, many snow enthusiasts do not carry these devices.

As such and coupled with the natural human tendency for self-rescue, a buried person will attempt to dig himself or herself out of the snow pack within which the person is buried. Shovels are standard safety equipment carried by snow enthusiast playing in avalanche prone areas and are used to dig a buried person out of the avalanche. The problem with such self-rescue is that the buried person, lacking a visual horizon and being subject to the omnidirectional pressure being exerted by the snow pack within which the person is buried, does not know which way is gravitationally up. Therefore, the person does not have any idea which way to dig leaving the person with a simple guess as to the correct direction to dig.

What is needed is a device that allows a person buried in snow to quickly and easily determine which way is gravitationally up in order to allow the person to dig in the appropriate direction for self-rescue after the person is buried in a snowpack. Such a device must not necessarily rely on a visual indicator as the device may not be viewable by the buried person. The device must be simple to operate and be relatively compact in size so as to be easily included as standard safety equipment for a snow recreationalist.

SUMMARY OF THE INVENTION

The avalanche self-rescue device of the present invention addresses the aforementioned needs in the art by providing a device that quickly tells a person buried in a snow pack which way is gravitationally up in order to allow the person to dig in such direction during snow burial self-rescue. The avalanche self-rescue device does not necessarily rely on visual indicia for its directional guidance so that the user does not have to have visual contact with the device as such visual contact may not be possible while buried in the snow pack. The avalanche self-rescue device is relatively compact in size so as to not hinder its inclusion in the safety equipment carried by a snow recreationalist and can be included on or integrated with other safety devices such as rescue beacons or even a standard cellular phone.

The avalanche self-rescue device of the present invention is comprised of a housing that has a top. A control circuit is provided. An accelerometer is disposed within the housing and is in signal communication with the control circuit. The accelerometer senses its orientation with respect to the gravitational horizon (the horizon that is perpendicular to the force of gravity). The orientation of the accelerometer coincides with the orientation of the top of the housing—if the accelerometer senses that it is oriented gravitationally upwardly, then the top of the housing is likewise oriented gravitationally upwardly. A speaker is coupled to the accelerometer such that whenever the accelerometer senses that it is oriented generally vertically upwardly with respect to the gravitational horizon, the speaker outputs a first tone. The speaker may output at least one second tone different from the first tone whenever the accelerometer senses that is it not oriented generally vertically upwardly with respect to the horizon. A light may be coupled to the accelerometer such that whenever the accelerometer senses that it is oriented generally vertically upwardly with respect to the gravitational horizon, the light outputs a light beam in a first color.

The light may output a light beam in a second color different from the first color whenever the accelerometer senses that is it not oriented generally vertically upwardly with respect to the horizon. The light may be located on the top of the housing and is tactilely distinguishable from the top. Alternately, or in addition, a protrusion may be located on the top of the housing. The housing may be an item of clothing, a helmet, a glove, a boot, a jacket, a pair of goggles, a rescue beacon, a cellular phone, etc.

BRIEF DESCRIPTION OF THE DRAWINGS

Similar reference numerals refer to similar parts throughout the several views of the drawings.

DESCRIPTION OF THE PREFERRED EMBODIMENT

Figure 1:
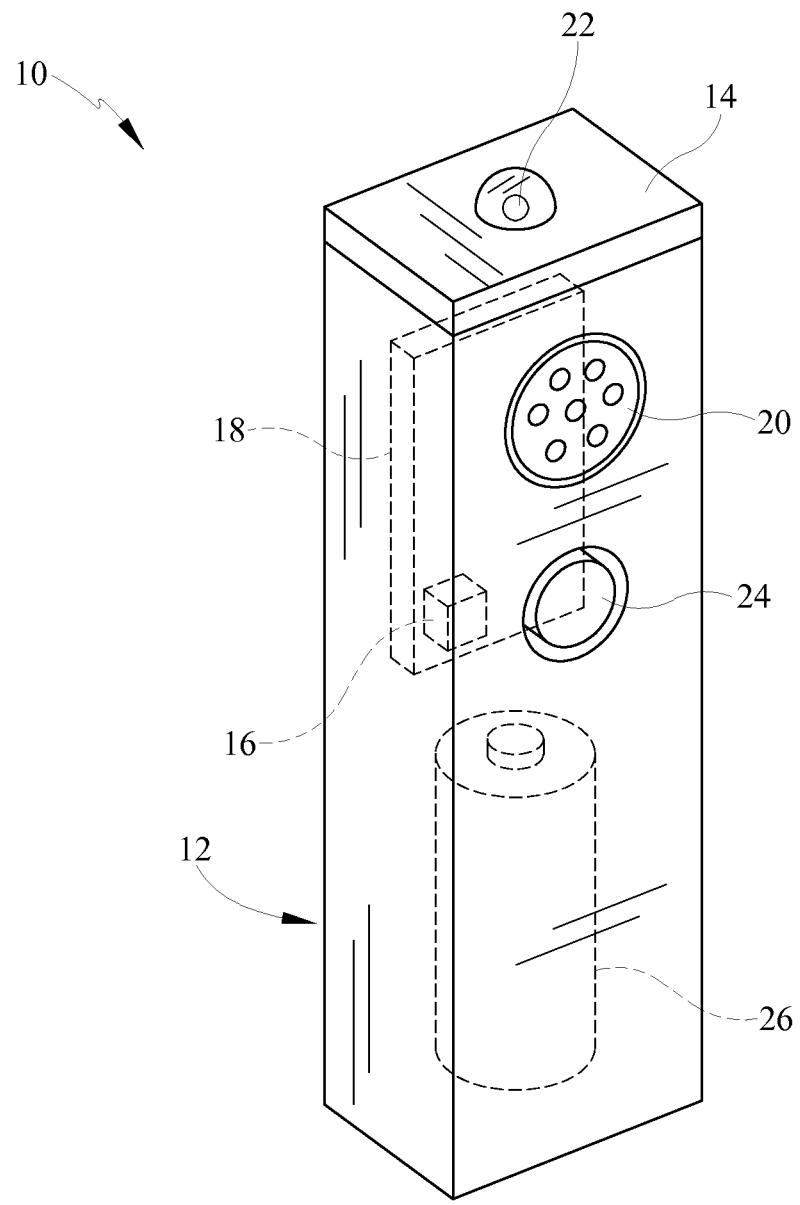
FIG. 1 is a perspective view of the avalanche self-rescue device of the present invention.

Referring now to the drawings, it is seen that the avalanche self-rescue device of the present invention, generally denoted by reference numeral 10, is comprised of a housing 12 that has a top 14. The housing 12 has an accelerometer 16 held therein, the accelerometer signal connected to a control circuit 18 held within the housing 12. The control circuit 18 is connected to a speaker 20 and possibly a light 22. The accelerometer 16, the control circuit 18, the speaker 20 and the light 22 are each connected to a battery 26 (rechargeable, including via solar recharge, replaceable, etc.,) in the usual way for providing a source of electrical power to the various components. A push button 24 is used to control the avalanche self-rescue device 10.

The accelerometer 16, which may also include a gyroscope, is formed as a MEMS (microelectromechanical systems) component in order to be compact and is capable of determining its orientation relative to gravity.

In order to use the avalanche self-rescue device 10, the push button 24 is depressed in order to activate the device. Once activated, the accelerometer 16 determines its gravitational orientation. If the top 14 of the housing 12 is pointing gravitationally upwardly, then the speaker 20 emanates a positive tone, otherwise, if the top 14 of the housing 12 is not pointing gravitationally upwardly, then the speaker either produces no tone, or produces a negative tone. The negative tone can either be a single negative tone or can be a graduated negative tone, the more the top 14 of the housing 12 is pointing away from gravitationally up, the more negative the tone is or the louder the negative tone is. Of course, the positive tone can be similar in that the closer the top 14 of the housing 12 is rotated toward being oriented gravitationally upwardly, the more positive the positive tone becomes and/or the louder the one becomes—in such a configuration, the positive tone can annunciate whenever the top 14 of the housing 12 is pointing above the gravitational horizon (the earth's horizon through which the force of gravity perpendicularly passes) and the negative tone can annunciate when the top 14 of the housing 12 is pointing into the gravitational horizon. Of course, the tone can be spoken words that give appropriate housing 12 rotational guidance to a user with any desired granularity of directions and/or commands implemented. An appropriate sound chip (not separately numbered) is resident on the control circuit 18 in order to dispense the various audio outputs through the speaker 20.

The light 22 operates in similar fashion to the speaker 20 so that the light may illuminate only when the top 14 of the housing 12 is pointing gravitationally upwardly or may illuminate in two or more colors, for example, green illumination when the top 14 of the housing 12 is pointing gravitationally upwardly, and red illumination otherwise, or green illumination when the top 14 of the housing 12 is pointing gravitationally upwardly, yellow illumination when the top 14 of the housing 12 is pointing above the gravitational horizon (and not gravitationally upwardly) and red illumination when the top 14 of the housing 12 is pointing below the gravitational horizon. The top 14 of the housing 12 needs to have some form of tactile implement thereon in order to allow a user, who may not have the ability to see the avalanche self-rescue device 10, only to hear the speaker 20, to be able to tactilely know the gravitational upward direction when the avalanche self-rescue device 10 so indicates. If the illustrated light 22 is not used, then the push button 24 can be located on the top 14 of the housing 12 or a simple protrusion can be used, etc.

Figure 2:
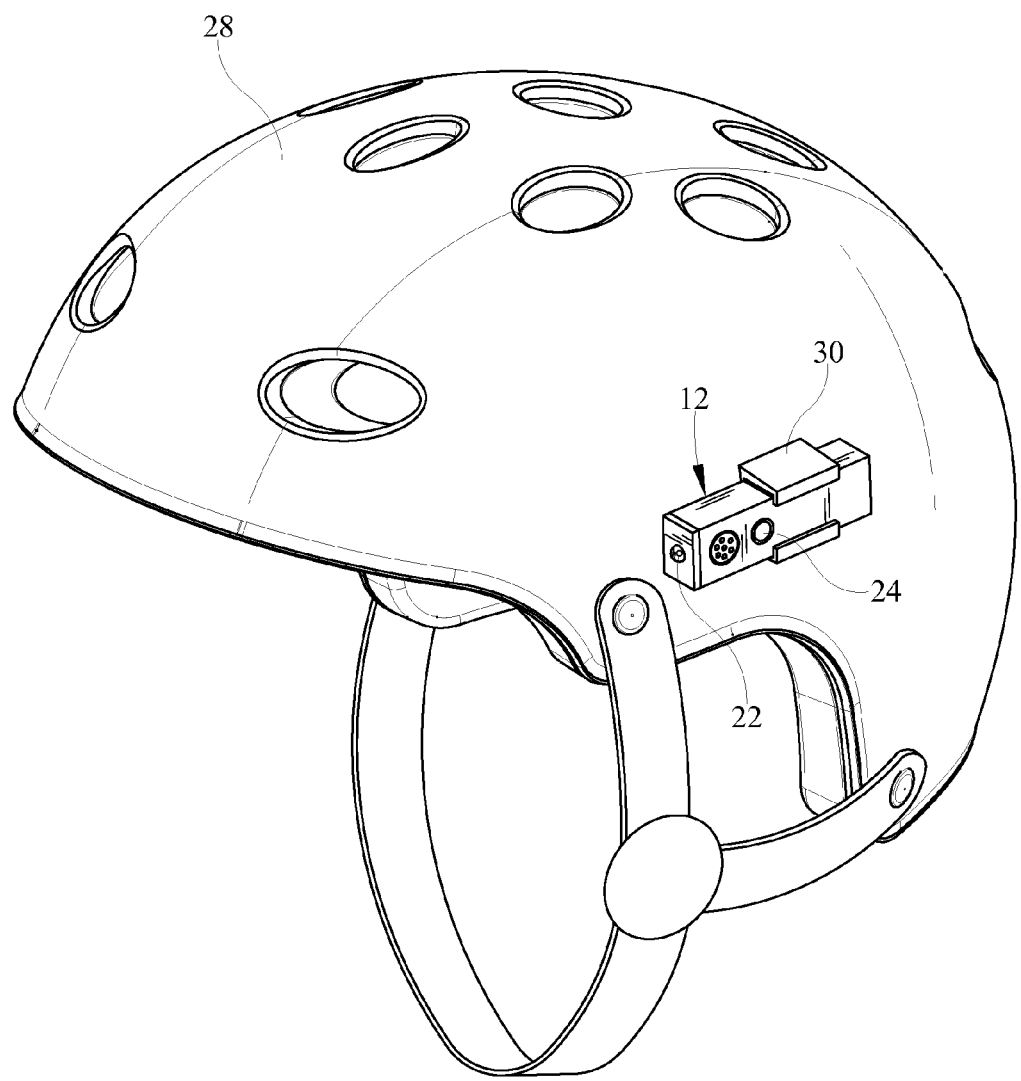
FIG. 2 is a perspective view of the avalanche self-rescue device mounted onto a helmet.
Figure 3:
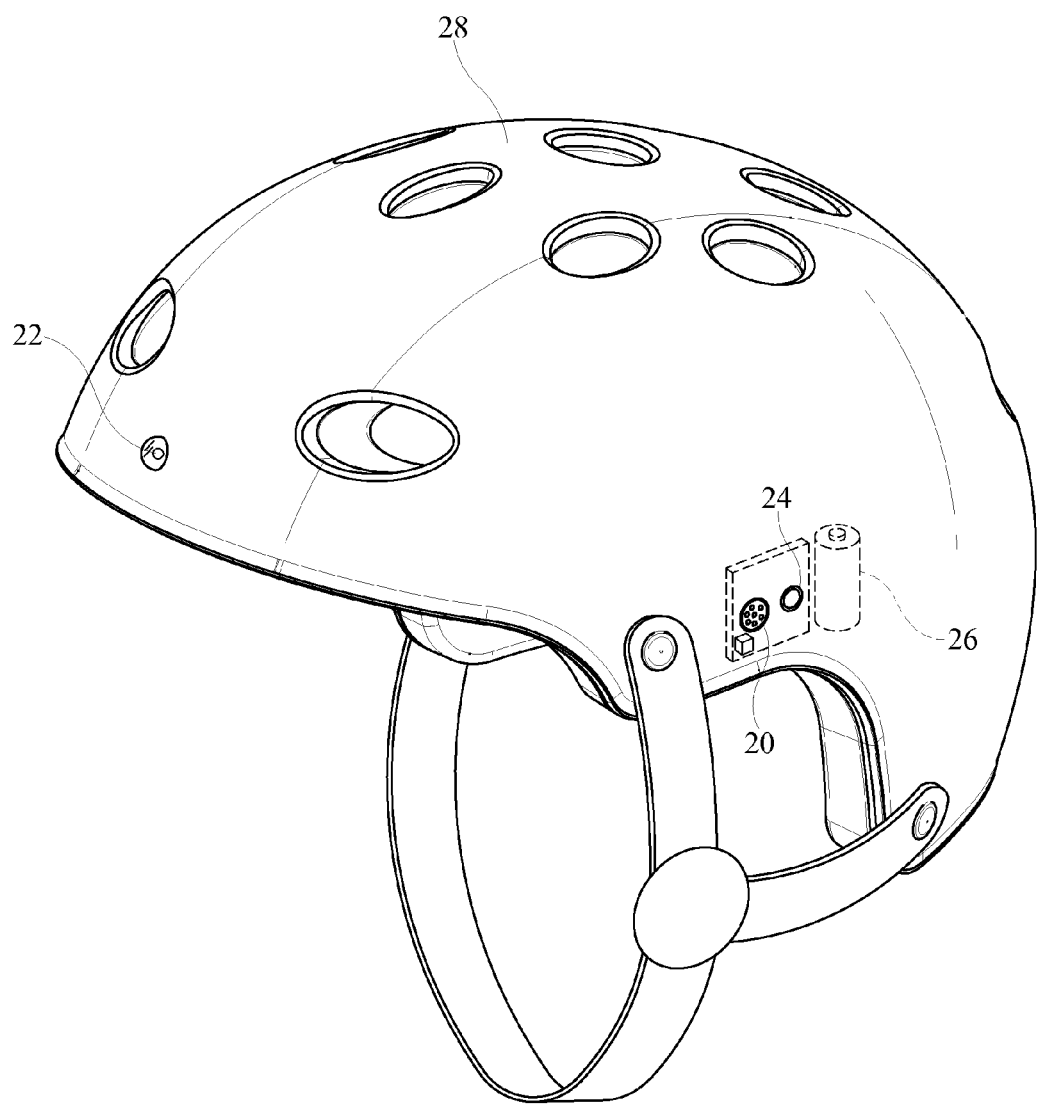
FIG. 3 is a perspective view of the avalanche self-rescue device integrated within the helmet.
Figure 4:
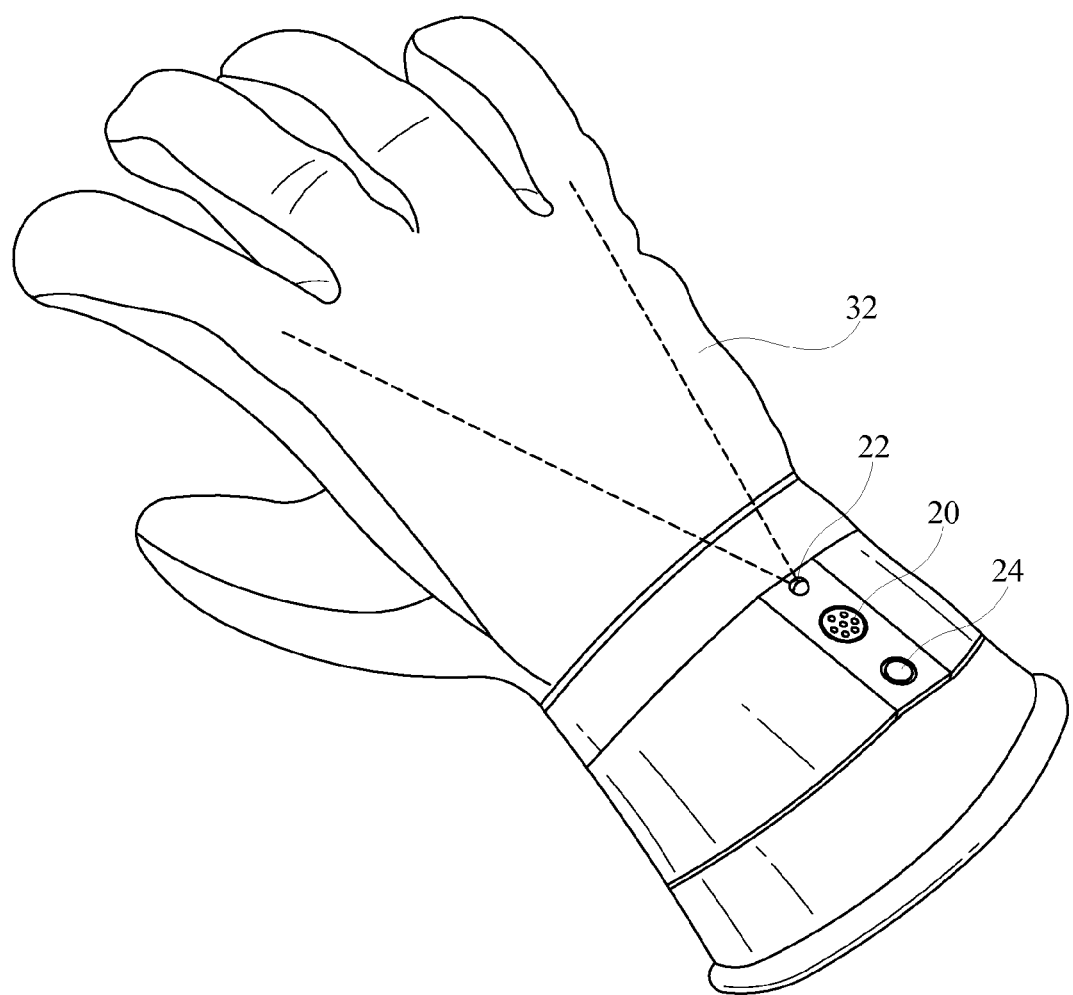
FIG. 4 is a perspective view of the avalanche self-rescue device integrated within a glove.
Figure 5:
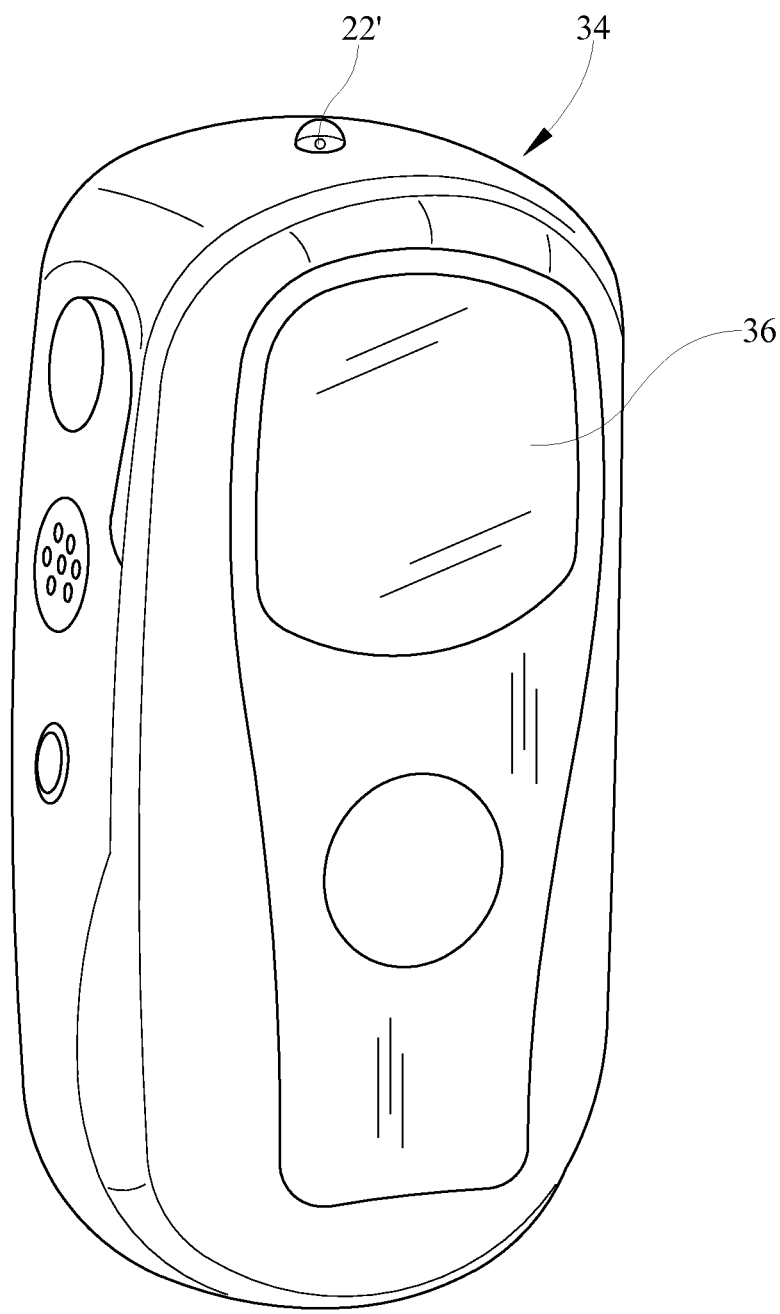
FIG. 5 is a perspective view of a typical avalanche rescue beacon having the avalanche self-rescue device integrated therein.
Figure 6:
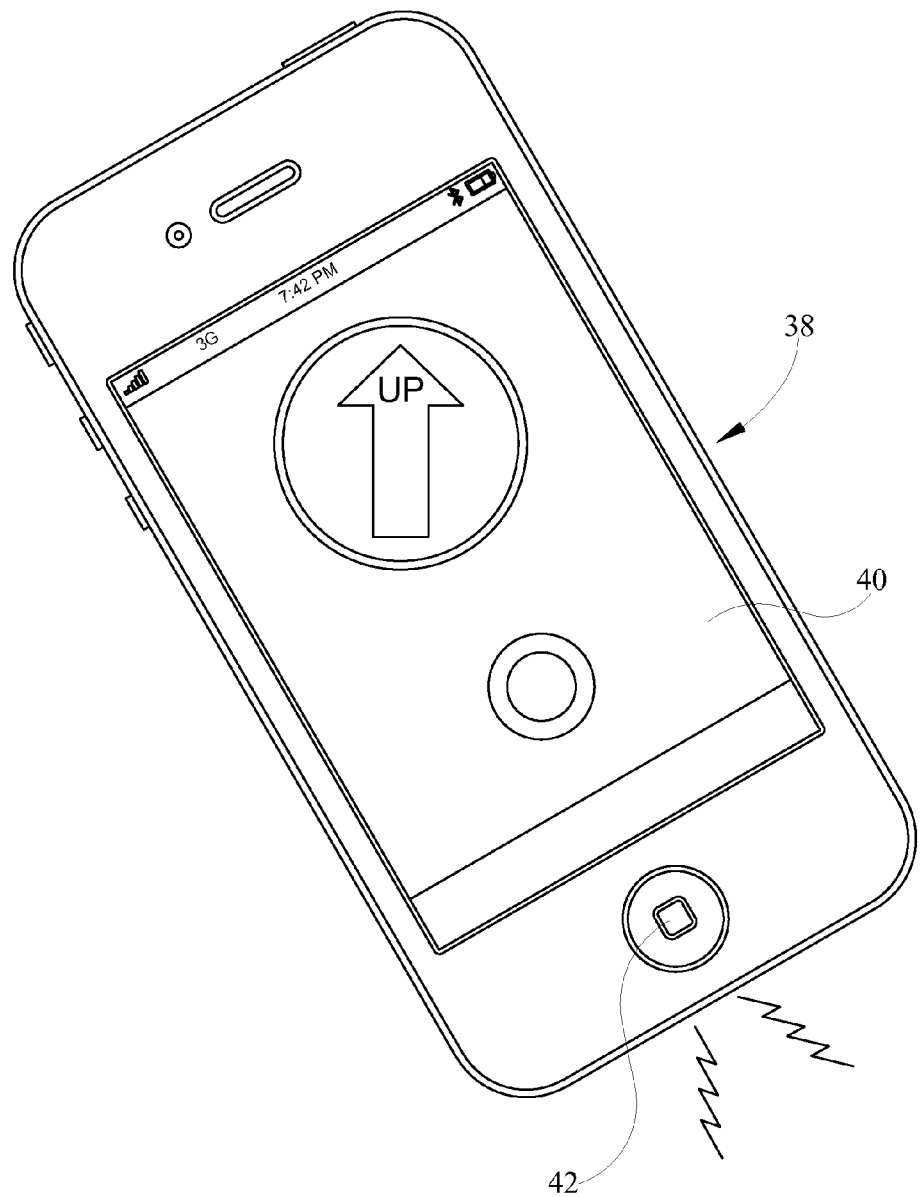
FIG. 6 is a perspective view of a typical cellular phone with the avalanche self-rescue device integrated therein.

As seen in FIGS. 1 and 2, the avalanche self-rescue device 10 can be a standalone device that can be handheld, stored in a user's pocket, etc., or can be attached to an item of clothing, safety equipment, such as the illustrated helmet 28 using an appropriate attachment clip 30 attached to the helmet 28, etc. In such a configuration, the user rotates his or her head until the desired orientation is reached via the audio and possibly visual cues provided. Of course, in such a helmet 28 attachment configuration, the top of the housing 12 can be redefined to be that portion of the housing 12 that is expected to be pointing gravitationally upwardly when the user is standing upright. Alternately, as seen in FIGS. 3 and 4, the present invention can be incorporated into other clothing, such as being incorporated into a glove 32 (boots, vest, goggles, hat, etc.,), as illustrated in FIG. 4, or can be integrated into the helmet 28, as illustrated in FIG. 3, ski polls, goggles, etc. The avalanche self-rescue device 10 can also be incorporated into a standard avalanche rescue beacon 34, such that either a light 22' is provided on the rescue beacon 34 for performing the visual indication of orientation with respect to gravitational upwardness, or the screen 36 of the rescue beacon 34 can perform the lighting function. As seen in FIG. 6, a typical cellular phone 38 can be programmed to perform the functions of the avalanche self-rescue device, as modern cellular phones 38 are already equipped with accelerometers and gyroscopes. The screen 40 of the cellular phone 38 performs the visual functions of the avalanche self-rescue device, as seen, in a more sophisticated manner relative to a simple light that illuminate or not, or that illuminates in two or more colors in providing orientation information. In both the rescue beacon 34 configuration, and the cellular phone 38 configuration, it is anticipated that a user is substantially familiar with the orientation of the respective device (e.g., a user knows that the phone's home button 42 is located at the bottom of the phone 38) so that a separate tactile component on the top of the respective device may not be necessary.

While the invention has been particularly shown and described with reference to an embodiment thereof, it will be appreciated by those skilled in the art that various changes in form and detail may be made without departing from the spirit and scope of the invention.

I claim:

1. An avalanche self-rescue device comprising:
   a housing having a top;
   a control circuit;
   an accelerometer disposed within the housing and in signal communication with the control circuit, the accelerometer sensing its orientation with respect to the gravitational horizon, the orientation of the accelerometer coinciding with the orientation of the top of the housing;
   a speaker coupled to the accelerometer such that whenever the accelerometer senses that it is oriented generally vertically upwardly with respect to the gravitational horizon, the speaker outputs a first tone and otherwise does not generate the first tone; and
   a light coupled to the accelerometer and located on the top of the housing and being tactilely distinguishable from the top, such that whenever the accelerometer senses that it is oriented generally vertically upwardly with respect to the gravitational horizon, the light outputs a first light beam in a first color and otherwise does not generate the first light beam in the first color.

2. The avalanche self-rescue device as in claim 1 wherein the speaker outputs a second tone different from the first tone whenever the accelerometer senses that is it not oriented generally vertically upwardly with respect to the gravitational horizon and otherwise does not generate the second tone.

3. The avalanche self-rescue device as in claim 1 wherein the light outputs a second light beam in a second color different from the first color whenever the accelerometer senses that is it not oriented generally vertically upwardly with respect to the gravitational horizon and otherwise does not generate the second light beam in the second color.

4. The avalanche self-rescue device as in claim 1 further comprising a protrusion located on the top of the housing.

5. The avalanche self-rescue device as in claim 1 wherein the housing is an item of clothing.

6. The avalanche self-rescue device as in claim 1 wherein the housing is a helmet.

7. The avalanche self-rescue device as in claim 1 wherein the housing is a glove.

8. The avalanche self-rescue device as in claim 1 wherein the housing is a rescue beacon.

9. The avalanche self-rescue device as in claim 1 wherein the housing is a cellular phone.

10. The avalanche self-rescue device as in claim 1 wherein the housing is selected from the group consisting of an item of clothing, a helmet, a glove, a rescue beacon and a cellular phone.

\* \* \* \* \*